Feb. 2, 1954  S. B. COHN  2,668,191
WAVE ENERGY POLARIZATION CONVERTER
Filed June 30, 1949
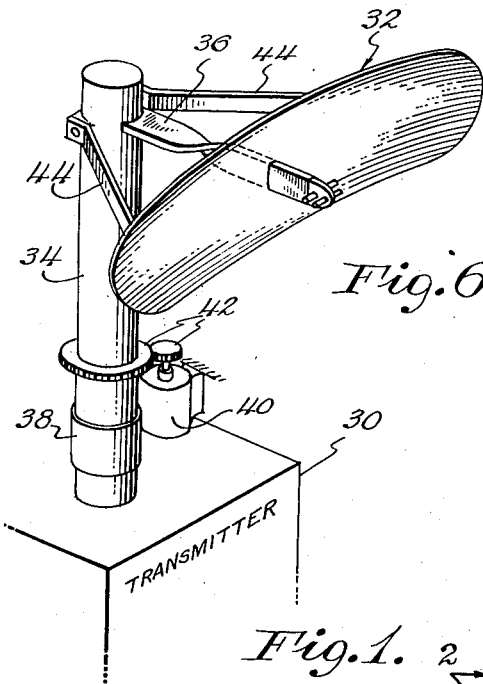
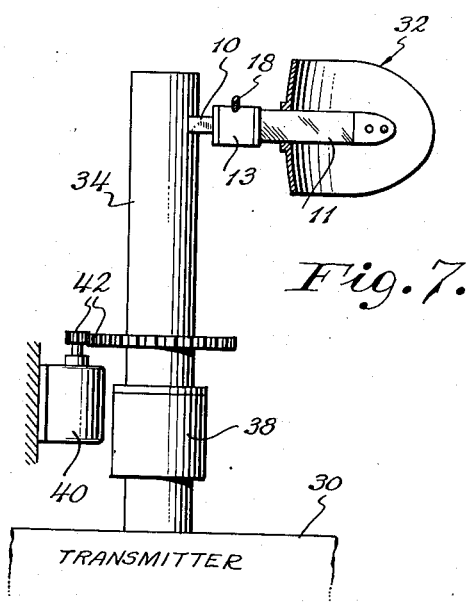
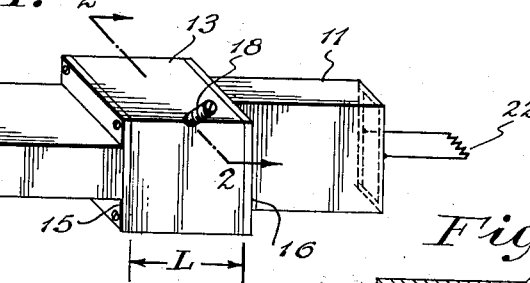
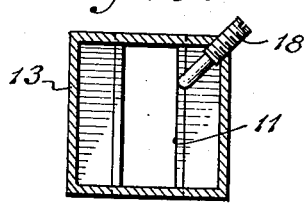
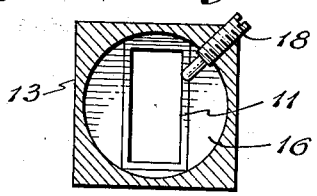
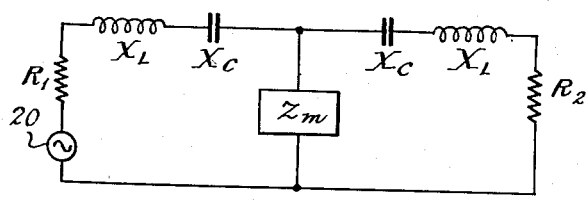
INVENTOR
SEYMOUR B. COHN
BY
Paul B. Hunter,
ATTORNEY Patented Feb. 2, 1954

2,668,191

UNITED STATES PATENT OFFICE 2,668,191

WAVE ENERGY POLARIZATION CONVERTER

Seymour B. Cohn, Flushing, N. Y., assignor to The Sperry Corporation, a corporation of Delaware Application June 30, 1949, Serial No. 102,369

1 Claim. (Cl. 333—21)

This invention relates to wave-energy coupling devices and particularly to apparatus for changing the polarization of wave-energy in a wave guide transmission system.

In ultra-high-frequency transmission systems it is often necessary to change the polarization of the electromagnetic energy conveyed by the system. In the past, where a change from one transverse electric polarization to another was required, polarization changes have been effected by employing a twisted rectangular wave guide or a circular wave guide containing a twisted strip of conductive material. An inherent disadvantage in such structures is the requirement of a long twisted section (of the order of several wavelengths at the operating frequency) in order to minimize reflected energy and standing waves in the transmission system. Such twisted sections are objectionable in many installations because of space limitations. Also such twisted sections are expensive to manufacture.

It is an object of this invention to provide wave-energy polarization changing apparatus which is compact and relatively inexpensive to manufacture.

Another object of this invention is to provide simple and compact wave-energy polarization changing apparatus in which negligible energy is reflected over a wide range of frequencies.

Further objects and advantages of the invention will be apparent from the following description, the appended claim, and the drawings in which:

Fig. 1 is a perspective view of one embodiment of the invention showing a rectangular polarization converter connected to an ultra-high-frequency transmission system employing rectangular wave guides;

Fig. 2 is a sectional view along line 2—2 in Fig. 1;

Fig. 3 is a sectional view of an alternative embodiment of the invention employing a cylindrical polarization converter for use in the transmission system disclosed in Fig. 1;

Fig. 4 is a simplified equivalent circuit of the device shown in Figs. 1 and 2;

Fig. 5 is an elevation view, partially broken away, of an embodiment of the invention employing a cylindrical polarization converter in an ultra-high-frequency transmission system employing circular wave guides;

Fig. 6 shows a conventional radar system employing a twisted rectangular wave guide polarization converter for conveying energy to an antenna; and Fig. 7 shows the radar system of Fig. 6 employing the polarization converter of the present invention for conveying energy to an antenna.

Referring now to Fig. 1, a rectangular wave guide 10 adapted to convey vertically polarized energy when excited by its dominant or $TE_{1,0}$ mode and a rectangular wave guide 11 having similar cross-sectional dimensions and adapted to convey horizontally polarized energy when excited by its dominant or $TE_{1,0}$ mode are attached to a box 13 by means of flanges 15 and 16. The walls of box 13 define a cavity which may be either the rectangular type shown in Fig. 2 or the cylindrical type shown in Fig. 3. Preferably the cavity of box 13 has a length L approximately equal to one-half the wavelength of the energy conveyed by wave guides 10 and 11 at the operating frequency. An adjustable irregularity or probe 18 extends into the cavity of box 13 approximately midway along the length of the cavity. Preferably the probe 18 extends in a radial direction toward the longitudinal axis of the cavity.

The rectangular cavity shown in Fig. 2 has two resonant modes in the operating frequency range (the axis of one mode being horizontal and the axis of the other mode being vertical), and the probe 18 serves to intercouple these two modes. The cylindrical cavity shown in Fig. 3 also has two resonant modes in the operating range and the probe 18 serves to intercouple the mode having a horizontal axis and the mode having a vertical axis.

The polarization converter serves as a bandpass filter having two resonant cavities. If wave guide 10 is excited in its dominant or $TE_{1,0}$ mode by energy from vertically polarized source 20, the cavity of box 13 is excited by vertically polarized electromagnetic energy. Without the probe 18, this vertically polarized energy will not excite wave guide 11 since wave guide 11 is dimensioned below cut-off for vertically polarized energy. However, the cavity of box 13 has two resonant modes at right angles to one another and the probe 18 serves to intercouple these two modes. Hence, when the cavity is excited by wave guide 10 with vertically polarized energy, the probe 18 serves to excite the other mode so that the cavity is also excited with horizontally polarized energy. This horizontally polarized energy will excite the dominant or $TE_{1,0}$ mode in wave guide 11 so that electromagnetic energy is conveyed to the horizontal polarization load 22. Thus, the vertically polarized energy conveyed by wave guide 10 is converted to horizontally polarized energy in the cavity of box 13 and supplied to wave guide 11.

The frequency response of the polarization converter is determined by the size of the cavity of box 13 and by the amount of coupling between the two modes which is proportional to the length of probe 18 within the cavity. Thus, the frequency response is that of a two-cavity filter, and it exhibits under-coupling, critical-coupling, or over-coupling as the extent of projection of the probe 18 into the cavity is increased.

If the length of the probe 18 within the cavity of box 13 is one-quarter wavelength at the operating frequency, the probe is resonant and the frequency response of the polarization converter is analogous to that of three intercoupled resonant circuits and hence a wider bandwidth frequency response is obtainable. In order to obtain a flat response with the three resonant circuits, the diameter or shape of the probe must be carefully chosen, as well as the length.

Larger size cavities may be employed in the polarization converter provided length L is an integral number of one-half guide wavelengths at the operating frequency; however maximum bandwidth is obtained with cavities having a length approximately equal to one-half the guide wavelength at the operating frequency.

For the apparatus shown in Figs. 1 and 2, bandwidths of the order of 5 to 10 percent with a standing-wave voltage ratio less than 1.1 have been obtained at a frequency of approximately 9,000 mc. by employing a probe 18 having a diameter of $\frac{3}{16}$ inch and a rounded end extended within the cavity of box 13 by approximately $\frac{3}{8}$ inch so as to produce a slightly over-coupled condition. The internal dimensions of the wave guides were 1.122 x 0.497 inches, and that of the box 1.122 x 1.122 x 0.780 inches.

Fig. 4 shows a circuit employing lumped constant elements which has frequency transmission characteristics substantially equivalent to the polarization converter disclosed in Figs. 1 and 2 for a rectangular cavity having vertical and horizontal axes of a length equal to the larger cross-sectional dimensions of wave guides 10 and 11 and a length L approximately equal to one-half of the wavelength of the energy conveyed by wave guides 10 and 11 at the operating frequency, where $R_1$ = the equivalent series resistance of the characteristic impedance of wave guide 10 and the discontinuity susceptance at the change between wave guide 10 and cavity 13, $R_2$ = the equivalent series resistance of the characteristic impedance of wave guide 11 and the discontinuity susceptance at the change between wave guide 11 and cavity 13, $$X_L = \frac{\pi Z_{01} \lambda_{g0}}{2\lambda_g}$$

$$X_c = \frac{\pi Z_{01} \lambda_g}{2\lambda_{g0}}$$

$Z_{01}$ = the characteristic impedance of a waveguide having the cross sectional dimensions of the cavity of box 13, $\lambda_{g0}$ = the resonant guide wavelength of the cavity of box 13, $\lambda_g$ = an operating guide wavelength close to $\lambda_{g0}$, $Z_m$ = the equivalent impedance introduced by probe 18.

If the probe is substantially shorter than $\frac{1}{4} \lambda$, $Z_m$ is capacitive, and the circuit has the response of two resonant coupled circuits. If the probe is a resonant length at the center of the band, $Z_m$ is a parallel resonant circuit, and the response is that of three resonant coupled circuits.

Fig. 5 shows an embodiment of the invention employing a cylindrical cavity 13' in a circular wave guide transmission system. As before, the length L of the cavity is preferably approximately equal to one-half the wavelength of the energy conveyed by the wave guide transmission system.

In this embodiment of the invention suppressor vanes 24 and 25 are required to cause the energy introduced and extracted from cavity 13' to be vertically and horizontally polarized, respectively, and to prevent the transmission of the vertically polarized energy in wave guide 10' through cavity 13' into wave guide 11', since wave guide 11' can convey either horizontally or vertically polarized energy.

Figs. 6 and 7 show how the invention disclosed herein may be employed to advantage in a radar transmitter system.

A conventional radar transmitter system for use in a P. P. I. radar system is indicated in Fig. 6. A transmitter 30 supplies electromagnetic energy to an antenna 32 through wave guides 34 and 36. The circular wave guide 34 conveys energy of the $TM_{0,1}$ mode which in turn excites the dominant or $TE_{1,0}$ mode in rectangular wave guide 36. This $TE_{1,0}$ mode is vertically polarized at the junction between wave guides 34 and 36, and the twisted portion of the rectangular wave guide 36 serves to convert this vertically polarized energy to the horizontally polarized energy required to excite the antenna 32 and cause the antenna to radiate horizontally polarized energy.

A rotatable choke joint 38 permits rotation of the upper portion of wave guide 34 by means of a motor 40 and gears 42. The antenna 32 is rigidly attached to the upper portion of wave guide 34 by means of the twisted rectangular wave guide 36, and the antenna 32 is rotated in a horizontal plane about the axis of circular wave guide 34 when the upper portion of wave guide 34 is rotated by means of motor 40 and gears 42.

Since the twisted portion of rectangular wave guide 36 must be several wavelengths long in order to minimize standing waves in the transmission system, it follows that the antenna 32 must be located a considerable distance from the circular wave guide 34. Thus, the weight of the antenna 32 cannot be supported entirely by the rectangular wave guide 36 and auxiliary supports such as struts 44 are required.

Also, with the great radius of the directive antenna mass, centrifugal force limitations require that it be turned at relatively low angular velocity.

Fig. 7 shows how applicant's polarization converter may be employed in the radar system shown in Fig. 6 so as to permit the use of a rotatable antenna offset a short distance from the axis of rotation thereby permitting the antenna system to be supported entirely by the wave guide system which conveys energy to the antenna, and making it feasible to rotate the antenna at considerably higher speed with the shorter mass radius.

As before, the circular wave guide 34 is excited by energy of the $TM_{0,1}$ mode. The energy in wave guide 34 serves to excite the vertically polarized $TE_{1,0}$ mode in wave guide 10 which is converted to horizontally polarized energy in the cavity of box 13 which in turn serves to excite the horizontally polarized $TE_{1,0}$ mode in wave guide 11. The energy conveyed by wave guide 11 serves to excite the antenna 32 and cause the antenna to radiate horizontally polarized energy as before.

Thus, by employing the polarization converter disclosed herein, the rotatable antenna 32 can be located near the axis of rotation and hence additional supporting means is not required.

It will be apparent that various modifications may be made in this invention. For example, a cavity resonator of different shape could be employed, the coupling probe could be located in other positions, a plurality of coupling probes could be employed, probes of different shape could be employed, coupling loops or other coupling means could be employed, and polarization conversions other than 90 degrees can be effected.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

Ultra-high frequency apparatus for transmitting and rotating the plane of polarization of electromagnetic energy comprising a pair of rectangular wave guides having their longitudinal axes in substantial alignment and their major transverse axes at right angles, a hollow conductive body joining the adjacent ends of the wave guides, said body having a cavity with a square cross-sectional outline and opening at opposed ends thereof into said hollow wave guides with the internal side walls forming the cavity being parallel to the walls of the wave guides, said cavity extending substantially a half wavelength at the operating frequency between the adjacent ends of the wave guides, and a conductive probe extending inwardly at an angle of substantially 45° from one corner thereof with respect to said major transverse axes of the wave guides, said probe being approximately one-quarter wavelength long at the operating frequency and being perpendicular to the longitudinal axes of the wave guides.

SEYMOUR B. COHN.

References Cited in the file of this patent

UNITED STATES PATENTS

| Number | Name | Date |
|---|---|---|
| 2,441,598 | Robertson | May 18, 1948 |
| 2,518,092 | Sunstein et al. | Aug. 8, 1950 |
| 2,524,268 | McCarthy | Oct. 3, 1950 |
| 2,546,742 | Gutton et al. | Mar. 27, 1951 |

OTHER REFERENCES

"Microwave Transmission Circuits," by Ragan (first edition) Radiation Lab. Series vol. 9, copyright May 21, 1948. Published by McGraw-Hill Book Company.